(12) United States Patent
Watanabe

(10) Patent No.: US 6,803,952 B1
(45) Date of Patent: Oct. 12, 2004

(54) SIGNAL READOUT CIRCUIT OF AN AMPLIFICATION TYPE SOLID-STATE IMAGING DEVICE

(75) Inventor: Takashi Watanabe, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/495,163

(22) Filed: Jan. 31, 2000

(30) Foreign Application Priority Data

Mar. 31, 1999 (JP) .......................................... 11-093045

(51) Int. Cl.$^7$ .......................... H04N 5/217; H04N 9/64; H04N 3/14; H01L 27/00
(52) U.S. Cl. ...................... 348/241; 348/307; 348/250; 250/208.1
(58) Field of Search ................................ 348/303, 304, 348/307, 241, 243, 245, 250, 294, 301, 300, 332; 250/208.1

(56) References Cited

U.S. PATENT DOCUMENTS

| | | | | |
|---|---|---|---|---|
| 4,843,473 A | * | 6/1989 | Bencuya et al. | ............. 348/306 |
| 5,274,459 A | * | 12/1993 | Hamasaki | .................... 348/249 |
| 5,434,619 A | * | 7/1995 | Yonemoto | .................... 348/241 |
| 5,737,016 A | * | 4/1998 | Ohzu et al. | .................. 348/241 |
| 5,998,779 A | * | 12/1999 | Kozuka | .................... 250/208.1 |
| 6,008,486 A | * | 12/1999 | Stam et al. | ............... 250/208.1 |
| 6,067,113 A | * | 5/2000 | Hurwitz et al. | ............. 348/241 |
| 6,118,115 A | * | 9/2000 | Kozuka et al. | .......... 250/208.1 |
| 6,166,769 A | * | 12/2000 | Yonemoto et al. | .......... 348/308 |
| 6,476,864 B1 | * | 11/2002 | Borg et al. | .................. 348/245 |
| 6,535,247 B1 | * | 3/2003 | Kozlowski et al. | .......... 348/241 |
| 6,538,693 B1 | * | 3/2003 | Kozuka | ....................... 348/241 |

FOREIGN PATENT DOCUMENTS

| | | | | |
|---|---|---|---|---|
| JP | 5-328224 | 12/1993 | | |
| JP | 07075024 A | * 3/1995 | .......... | H04N/5/335 |
| JP | 11346332 A | * 12/1999 | .......... | H04N/5/335 |

OTHER PUBLICATIONS

T. Nakamura, et al.; *Gate–Stored MOS Phototransister Image Sensor*, Journal of Television Association, vol. 41, No. 11, pp. 1047–1053, 1987.

S.K. Mendis, et al., *A 128 + 128 CMOS Active Pixel Image Sensor for Highly Integrated Imaging Systems*; IEDM, pp. 583–586, 1993.

* cited by examiner

*Primary Examiner*—Wendy R. Garber
*Assistant Examiner*—John Villecco
(74) *Attorney, Agent, or Firm*—Edwards & Angell, LLP; David G. Conlin; George N. Chaclas

(57) ABSTRACT

An amplification type solid-state imaging device includes a pixel region including a plurality of amplification type photo-electric conversion elements arranged in a matrix array, vertical signal lines for transmitting a pixel signal and a reference signal for each pixel, a plurality of horizontal signal lines, a horizontal scanning circuit for transmitting signal pairs each including the pixel signal and the reference signal to the plurality of horizontal signal lines, a selection switch for sequentially switching the plurality of horizontal signal lines and for leading the plurality of horizontal signal lines into a common signal line, and a differential signal detection circuit in the common signal line for providing a differential signal between the pixel signal and the reference signal.

14 Claims, 10 Drawing Sheets

SIGNAL READOUT CIRCUIT OF AN AMPLIFICATION TYPE SOLID-STATE IMAGING DEVICE

CROSS-REFERENCES TO RELATED APPLICATIONS

This application is related to Japanese patent application No. HEI 11(1999)-093045 filed on Mar. 31, 1999 whose priority is claimed under 35 USC §119, the disclosure of which is incorporated herein by reference in its entirety.

BACKGROUND OF THE INVENTION

1. Field of the Invention

The present invention relates to an amplification type (or an active pixel type) solid-state imaging device and, more particularly, to a signal readout circuit of an amplification type solid-state imaging device which features a reduced per-pixel fixed pattern noise (FPN) and a reduced load capacitance of each horizontal signal line.

2. Description of the Related Art

Hitherto known as solid-state imaging devices (two-dimensional image sensors) are amplification type solid-state imaging devices (generally referred to as "CMOS image sensors") which are adapted to convert a signal charge generated in each pixel to a voltage signal or an electric current signal and amplify the signal within the pixel, and then read out the amplified signal by a scanning circuit, rather than directly read out the signal charge. In such an amplification type solid-state imaging device, each pixel has a configuration of horizontal type wherein a photo-electric conversion section and an amplification section are arranged in the same plane, or of vertical type wherein a photo-electric conversion section and an amplification section are three-dimensionally arranged.

One exemplary pixel configuration of the horizontal type is known as a APS type as shown in FIG. 8 (S. K. Mendis, etal., "A 128×128 CMOS Active Pixel Image Sensor for Highly Integrated Imaging Systems", IEDM '93, 583–586, December 1993). Referring to FIG. 8, a signal charge generated in a photo-electric conversion section 101 is transferred to the gate of a transistor 103 via a transistor 102 thereby to generate a voltage signal. In the transistor 103, the voltage signal is subjected to impedance conversion (current amplification), and the resulting signal $V_{sig}$ is read out via a pixel selection switch 104. After the signal read-out, the signal charge accumulated at the gate of the transistor 103 is discharged to $V_D$ by a reset transistor 105.

One exemplary pixel configuration of the vertical type is known as a CMD type as shown in FIG. 9 (Nakamura, et al., "Gate Accumulation Type MOS Photo-transistor Image Sensor", Journal of Television Association, Vol.41, No. 11, pp. 1047–1053, 1987). Referring to FIG. 9, a signal charge generated by photo-electric conversion is accumulated at the channel region below the gate of a transistor 111. Then, a characteristic change of the transistor 111 due to the signal charge is read out as an output signal $V_{sig}$ by applying a read-out voltage ($\phi_x$) to the gate. That is, the photo-electric conversion, amplification and pixel selection are carried out in the transistor 111. For a reset operation, a voltage ($\phi_R$) sufficiently higher than the read-out voltage is applied to the gate to discharge the signal charge to a substrate.

The pixels of the amplification type solid-state imaging device each having the configuration shown in FIG. 8 or 9 are each represented by a schematic diagram shown in FIG. 10. Herein, a pixel 131 carries out the photo-electric conversion, the amplification, the read-out and the reset operation. The read-out and the reset are controlled through signal lines $\phi_x$ and $\phi_R$, respectively. An amplified signal $V_{sig}$ is outputted from the pixel 131.

FIG. 11 illustrates an exemplary two-dimensional image sensor which employs the aforesaid pixels for the amplification type solid-state imaging device. The pixels 131 each have the same configuration as shown in FIG. 10. In a two-dimensional pixel region 140, the pixels 131 are two-dimensionally arranged. The read-out from the pixels 131 is controlled by a signal 143 from a first vertical scanning circuit 141, and the reset is controlled by a signal 144 from a second vertical scanning circuit 142. Output signals of each of the pixels (pixel signal) are applied to a correlated double sampling (CDS) circuit 150 provided in association with each vertical signal line to output a differential between a signal outputted at the read-out and a signal outputted at the reset. Therefore, variations in threshold among the pixels are eliminated for suppression of the per-pixel FPN.

The signal from the CDS circuit 150 is applied to an amplifier (column amplifier) 155, and held at an input side of the amplifier 155. The signal amplified by the amplifier 155 is controlled by a signal 161 from a horizontal scanning circuit 160 so as to be directed to a horizontal signal line 164 via a read-out switch 156. Since the read-out switches 156 are horizontally selected in sequence, signals from the respective amplifiers 155 are sequentially outputted to the horizontal signal line 164. The signals from the horizontal signal line 164 are each applied to an amplifier 169 for amplification thereof, and the amplified signals are each outputted as an output signal OS to a signal line 170.

However, the amplification type solid-state imaging device shown in FIG. 11, if having a greater horizontal pixel number, suffers from great difficulty in read-out. This will be explained with reference to a circuit diagram and a timing chart shown in FIGS. 11 and 12, respectively. It is herein assumed that the cycle of the clock $\phi_c$ of the horizontal scanning circuit 160 is T. A read-out pulse $\phi_H(j)$ is sequentially shifted by a width of T at an interval of T into a pulse $\phi_H(j+1)$, a pulse $\phi_H(j+2)$, a pulse $\phi_H(j+3)$ and the like to drive the read-out switches 156. If the horizontal read-out clock rate is increased with the increase of the horizontal pixel number, the cycle T is reduced. Since the number of the read-out switches 156 connected to the horizontal signal line 164 is increased, the load capacitance of the horizontal signal line 164 is increased. Therefore, the amplifiers 155 are required to drive the signal line 164 having a greater load in a shorter period T, so that a greater pixel number makes the driving more difficult. Further, it is also necessary to reduce the ON resistances of the read-out switches 156. In this case, however, there is a need to increase the size of the read-out switches 156, resulting in a further increase in the load capacitance of the horizontal signal line 164. This makes the driving further more difficult.

An approach to the aforesaid problem is described in Japanese Unexamined Patent Publication No.Hei 5(1993)-328224, which discloses an amplification type solid-state imaging device which includes a plurality of horizontal signal lines for parallel read-out. A block diagram of circuitry of the imaging device and a timing chart for the circuitry are shown in FIGS. 13 and 14, respectively. Referring to FIG. 13, each four vertical signal lines 145 are grouped, and respectively connected to four horizontal signal lines 164-1 to 164-4 via corresponding CDS circuits 150, read-out switches 156 and amplifiers 155. The CDS circuits 150 are each driven by a clamp pulse $\phi_{C1}$ and a sample/hold pulse $\phi_{S1}$, so that practical signal components with smaller variations among the pixels are outputted.

In this circuitry, the (2m−1)-th switches or the (2m)-th switches (m: a positive integer) of the read-out switches 156 in each four-line group are connected in common to a horizontal scanning circuit 160, and driven by a pulse $\phi_H(1)$, $\phi_H(2)$, $\phi_H(3)$, . . . . As shown in FIG. 14, the pulse $\phi_H$ is shifted by a pulse width of 2T at an interval of T, wherein T is a clock cycle. Therefore, signals $O_1, O_2, O_3, O_4, \ldots$ are outputted from the respective vertical lines to the four horizontal signal lines $S_1, S_2, S_3$ and $S_4$, as shown in FIG. 14. Each two of the horizontal signal lines are combined by a switch 167-1 or 167-2, which is driven by a pulse $\phi_S$ or an inverted bar-$\phi_s$, to provide an output OUT1 or OUT2. This is shown in FIG. 14. In this approach, the amplifiers 155 on the respective vertical signal lines are each read in a period of 2T with sufficient time. Further, the load capacitance of each of the horizontal signal lines are reduced to one fourth the load capacitance in the circuitry shown in FIG. 11, so that the driving load is reduced for easier high-speed driving.

However, the approach shown in FIGS. 13 and 14 suffers from the following problems. First, there are small variations in characteristic properties such as offset level and capacitance level among the horizontal signal lines. Accordingly, there remain some variations in the output signals OUT1 and OUT2 before these output signals are combined. Further, the two output signals OUT1 and OUT2 are ultimately provided, so that an additional signal combining process is required. This complicates the overall process, and inevitably entails variations in the two signals.

In view of the foregoing, the present invention is directed to an amplification type solid-state imaging device which ensures a higher horizontal read-out rate with the use of a plurality of horizontal signal lines while eliminating signal variations among the horizontal signal lines. Such an imaging device is capable of outputting a high quality image at a high speed while effectively suppressing the fixed pattern noise even at high speed read-out.

SUMMARY OF THE INVENTION

In accordance with the present invention, there is provided an amplification type solid-state imaging device, comprising: a pixel region including a plurality of amplification type photo-electric conversion elements arranged in a matrix array and each defining a pixel; vertical signal lines provided in a one-to-one correspondence with columns of the array in the pixel region for transmitting a pixel signal and a reference signal for each pixel; a plurality of horizontal signal lines; a horizontal scanning circuit for sequentially transmitting signal pairs each including the pixel signal and the reference signal from the respective vertical signal lines to the plurality of horizontal signal lines; a selection switch for sequentially switching the plurality of horizontal signal lines to selectively apply the signal pairs each including the pixel signal and the reference signal from the plurality of horizontal signal lines into a single common signal line; and a differential signal detection circuit for providing a differential signal between the pixel signal-and the reference signal in each of the signal pairs transmitted through the common signal line.

The amplification type solid-state imaging device of the present invention, which employs the plurality of horizontal signal lines, is adapted to read out the signal pairs in parallel from the plurality of horizontal signal lines. Therefore, the horizontal read-out speed is reduced, and the load capacitance of each of the horizontal signal lines is reduced. Even if the overall read-out speed is increased, proper driving of the imaging device can be ensured.

Further, the horizontal signal lines driven in parallel are finally combined into the single common signal line, from which a differential between the pixel signal and the reference signal from each of the horizontal signal lines is outputted. Therefore, even if signal variations among the respective horizontal signal lines occur due to differences in intrinsic characteristics among the horizontal signal lines, such signal variations can be eliminated, so that the resulting output signal is equivalent to that provided through a single horizontal line read-out operation.

Thus, the amplification type solid-state imaging device can effectively suppress the fixed pattern noise even at high speed read-out.

BRIEF DESCRIPTION OF THE DRAWINGS

FIG. 7(*b*) is a graph illustrating a relationship between an input and an output;

DETAILED DESCRIPTION OF THE INVENTION

Figure 1:
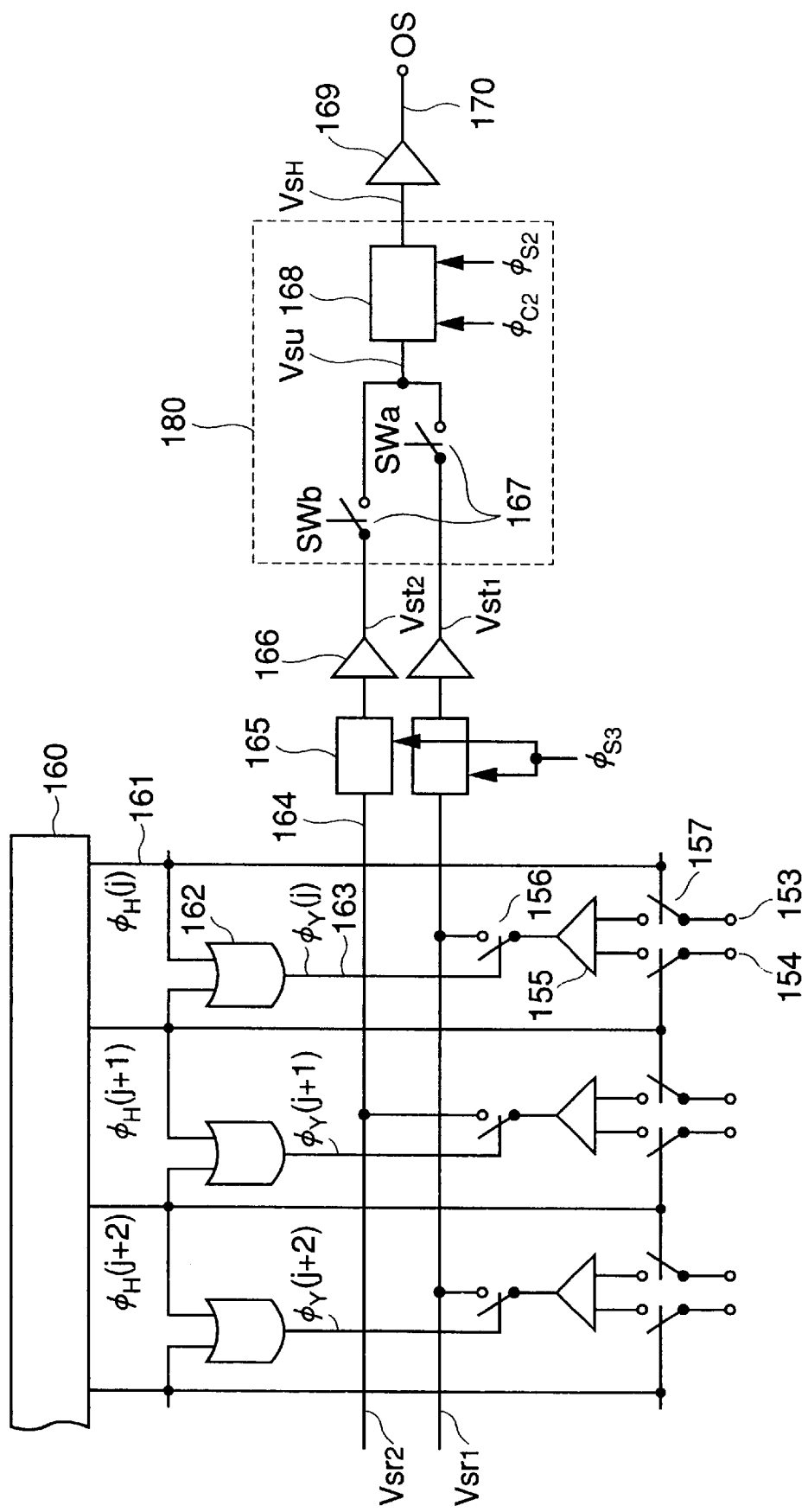
FIG. 1 is a circuit block diagram illustrating an amplification type solid-state imaging device according to one embodiment of the present invention.

In the present invention, where n horizontal signal lines (n: an integer not smaller than 2) are provided, it is desirable that each n consecutive vertical signal lines are grouped and respectively connected to the n horizontal signal lines. In this case, the number of the horizontal signal lines is suitably two or three.

For the sequential transmission of the signal pairs from the respective vertical signal lines to the corresponding horizontal signal lines, read-out switches are provided between the vertical signal lines and the horizontal signal lines, and the read-out switches are sequentially opened and closed by the horizontal scanning circuit to read out the pixel signal and the reference signal in pair from each of the vertical signal lines.

An amplifier is preferably provided on each of the vertical signal lines, whereby the signals on the vertical signal lines can assuredly be transmitted to the corresponding horizontal signal lines.

A sample/hold circuit and a buffer amplifier are preferably provided between the selection switch and each of the horizontal signal lines, whereby horizontal signal transmission can assuredly be carried out at a high speed. The selection switch may be comprised of a known switching circuit.

The pixel signal may be a signal applied at light reception by each of the amplification type photo-electric conversion elements, and the reference signal maybe a signal applied at reset of each of the amplification type photo-electric conversion elements. Alternatively, the pixel signal may be a differential signal between the signal applied at the light reception by each of the amplification type photo-electric conversion elements and the signal applied at the reset, and the reference signal may be a constant potential signal.

A clamp circuit and a sample/hold circuit are preferably provided on the common signal line, so that the differential signal between the pixel signal and the reference signal is provided by clamping one of the pixel signal and the reference signal transmitted in pair through the common signal line, e.g., the pixel signal, by the clamp circuit, and sampling and holding the other signal, e.g., the reference signal, by the sample/hold circuit. The clamp circuit may comprise capacitors respectively connected to the horizontal signal lines in series, an inverting amplifier provided on the common signal line, and a short switch provided between an input and an output of the inverting amplifier. With this arrangement, the signals on the common signal line are subjected to a correlated double sampling operation at a high speed, so that the signal variations due to differences in characteristics of amplifiers respectively provided on the vertical signal lines as well as the signal variations among the horizontal signal lines can be eliminated even at high speed read-out.

The present invention will hereinafter be described in detail by way of embodiments thereof with reference to the attached drawings. It should be noted that the invention be not limited by these embodiments.

FIG. 1 is a circuit block diagram illustrating an amplification type solid-state imaging device according to one embodiment of the present invention. In FIG. 1, there are shown first vertical lines 153, second vertical lines 154, vertical signal line continuity switches 157, amplifiers 155, read-out switches 156, a horizontal scanning circuit 160, horizontal scanning signal lines 161, OR circuits 162, OR circuit signal lines 163, two horizontal signal lines 164 for transmitting horizontal signals $V_{sr1}$ and $V_{sr2}$, two sample/hold circuits 165, two buffer amplifiers 166, two selection switches 167, a CDS circuit 168, a buffer amplifier 169, and a sensor signal line 170 for outputting a sensor signal OS. In the following explanation, the signal lines will often be designated by designations of signals to be transmitted therethrough for convenience.

The amplification type solid-state imaging device of the present invention is incorporated in an image reader as a two-dimensional CMOS image sensor for use.

As will be described later in detail, the amplification type solid-state imaging device of this embodiment includes a two-dimensional pixel region including a plurality of pixels arranged in a matrix array for performing photo-electric conversion, amplification, read-out and reset operations. Vertical signal lines, one for each column of the pixel array, are led from the two-dimensional pixel region. Signals are obtained from each of the vertical signal lines at the pixel read-out (light reception) and at the reset.

The amplifiers 155 are provided in a one-to-one correspondence with the respective vertical signal lines. The two signal lines, i.e., the first vertical signal line 153 and the second vertical signal line 154, are connected to each of the amplifiers 155 via the corresponding vertical signal line continuity switch 157. First and second exemplary circuits to be provided between the pixels and the amplifiers 155 are shown in FIGS. 3 and 4, respectively.

Figure 3:
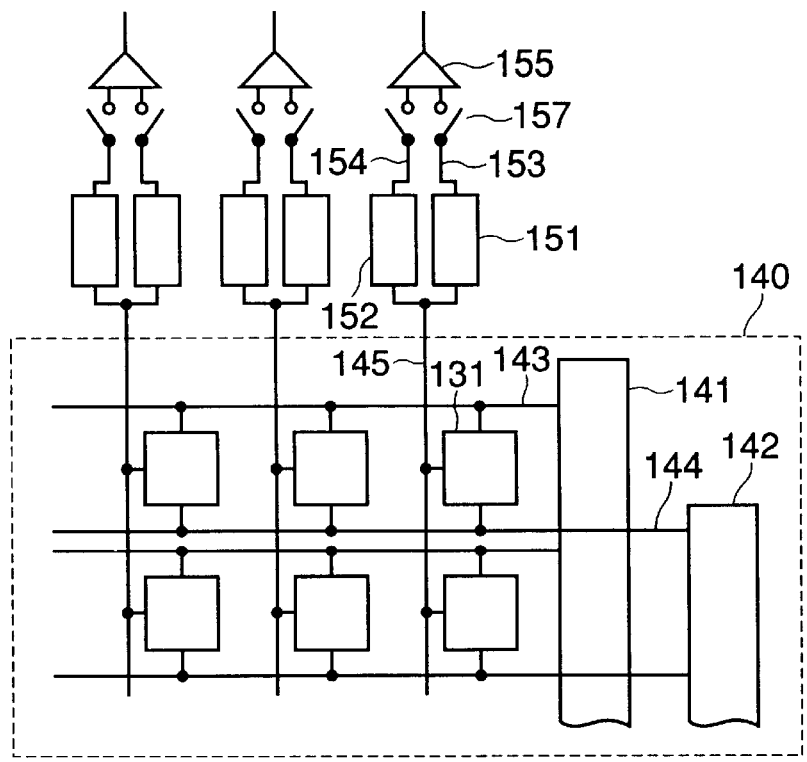
FIG. 3 is a block diagram illustrating an example of a first circuit from a pixel to an amplifier in an amplification type solid-state imaging device according to one embodiment of the present invention.
Figure 4:
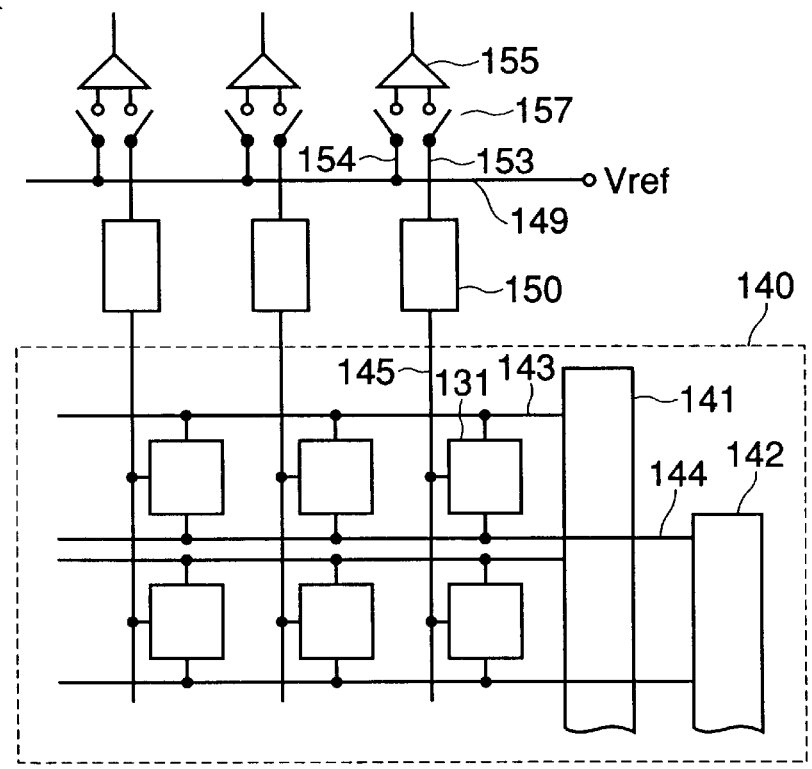
FIG. 4 is a block diagram illustrating an example of a second circuit from a pixel to an amplifier in an amplification type solid-state imaging device according to one embodiment of the present invention.

In FIGS. 3 and 4, there are shown pixels 131 each comprised of an amplification type photo-electric conversion element which performs the photo-electric conversion, amplification, read-out and reset operations, a two-dimensional pixel region 140 in which the pixels are arranged in a matrix array, a first vertical scanning circuit 141 for controlling the read-out operation at light reception by the pixels, a second vertical scanning circuit 142 for controlling the pixel reset operation, read-out scanning signal lines 143, reset scanning signal lines 144, vertical signal lines 145 from which signals are outputted at the pixel read-out and at the reset, a common reference signal line 149, CDS circuits 150, and memories 151 and 152.

Figure 11:
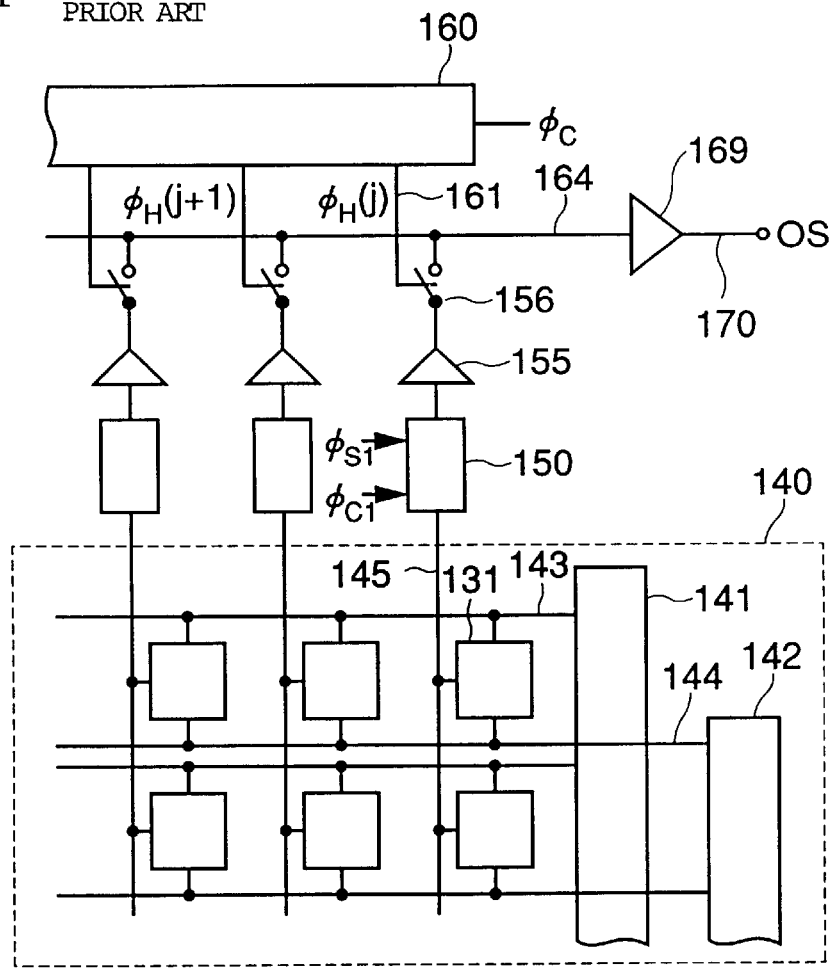
FIG. 11 is a circuit block diagram according to conventional amplification type solid-state imaging device.
Figure 12:
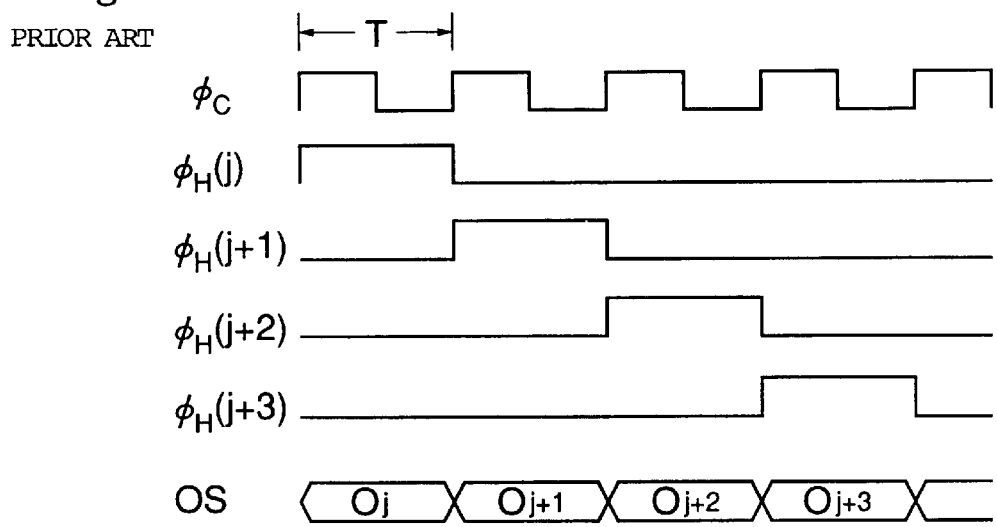
FIG. 12 is a timing chart illustrating signal application timing for the circuitry of the conventional amplification type solid-state imaging device shown in FIG. 11.
Figure 13:
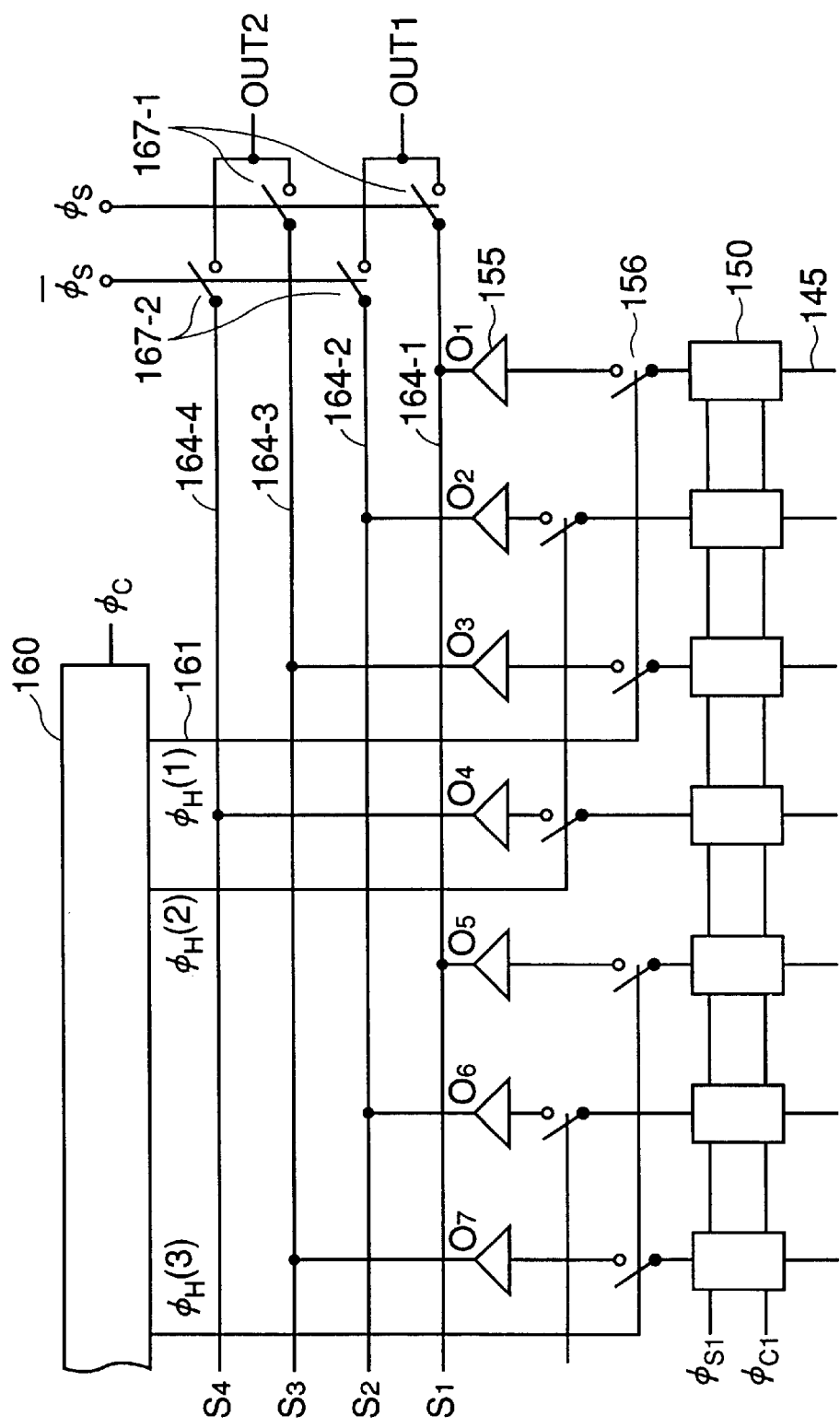
FIG. 13 is a circuit block diagram according to a conventional amplification type solid-state imaging device wherein four vertical signal lines are grouped.
Figure 14:
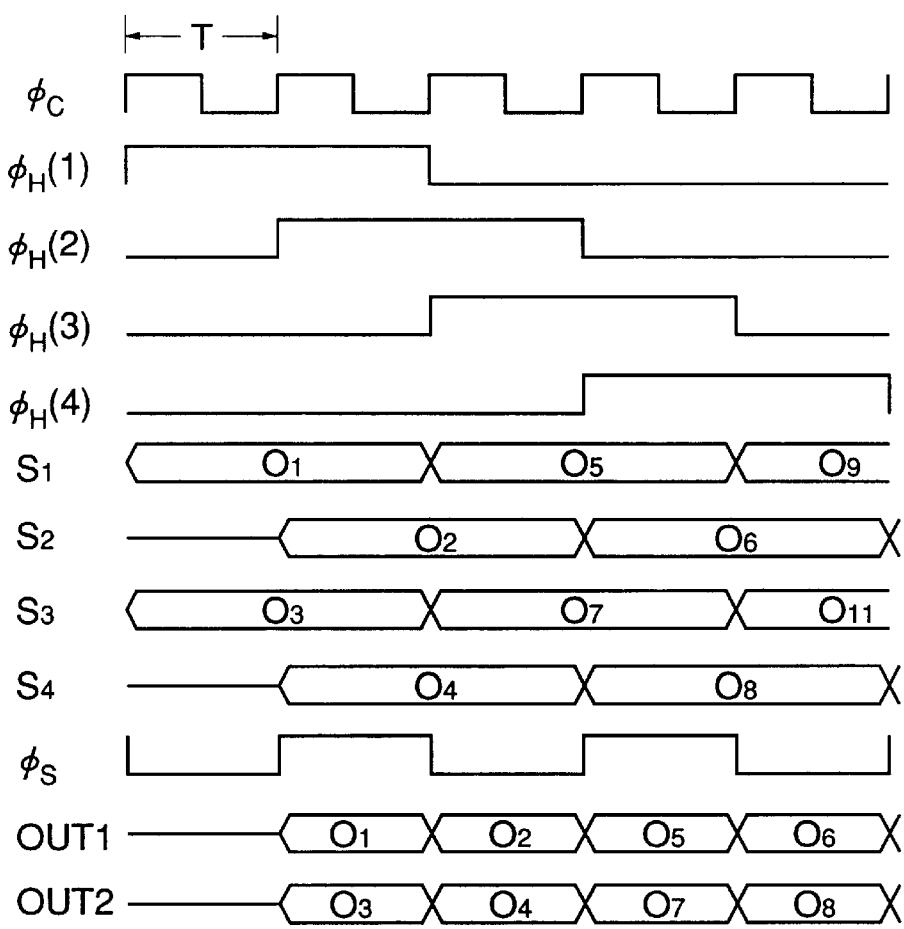
FIG. 14 is a timing chart illustrating signal application timing for the circuitry of the conventional amplification type solid-state imaging device shown in FIG. 13.

In the first circuit, the two-dimensional pixel region 140 is equivalent to the two-dimensional pixel region 140 shown in FIG. 11. In the first circuit, a pair of memories 151, 152 are connected to each of the vertical signal lines 145. The memory 151 holds a signal applied thereto at the pixel read-out, while the memory 152 holds a signal applied thereto at the reset. The signals held by these memories are respectively transmitted through the first vertical signal line 153 and the second vertical signal line 154 and then applied to the amplifier 155 via the vertical signal line continuity switch 157.

In the second circuit, the two-dimensional pixel region 140 is equivalent to the two-dimensional pixel region 140 shown in FIG. 11. In the second circuit, a signal from the CDS circuit 150 is transmitted through the first vertical signal line 153, and then applied to the amplifier 155 via the vertical signal line continuity switch 157, as in the circuitry shown in FIG. 11. The signal on the first vertical signal line 153 is a differential signal which is indicative of a differential between a signal applied thereto at the pixel read-out and a signal applied thereto at the reset and has a reduced per-pixel FPN. What is different from the circuitry shown in FIG. 11 is that the common reference signal line 149 is provided to which a signal of a constant potential $V_{ref}$ is applied from a reference power source, and the signal is applied from the second vertical signal line to the amplifier 155 via the vertical signal line continuity switch 157.

The circuit portion provided between the pixels 131 and the amplifiers 155 may be comprised of either the first circuit or the second circuit. The signal applied from the first vertical signal line 153 to the amplifier 155 and the signal applied from the second vertical signal line 154 to the amplifier 155 will hereinafter be referred to as "pixel signal" and "reference signal", respectively.

Figure 2:
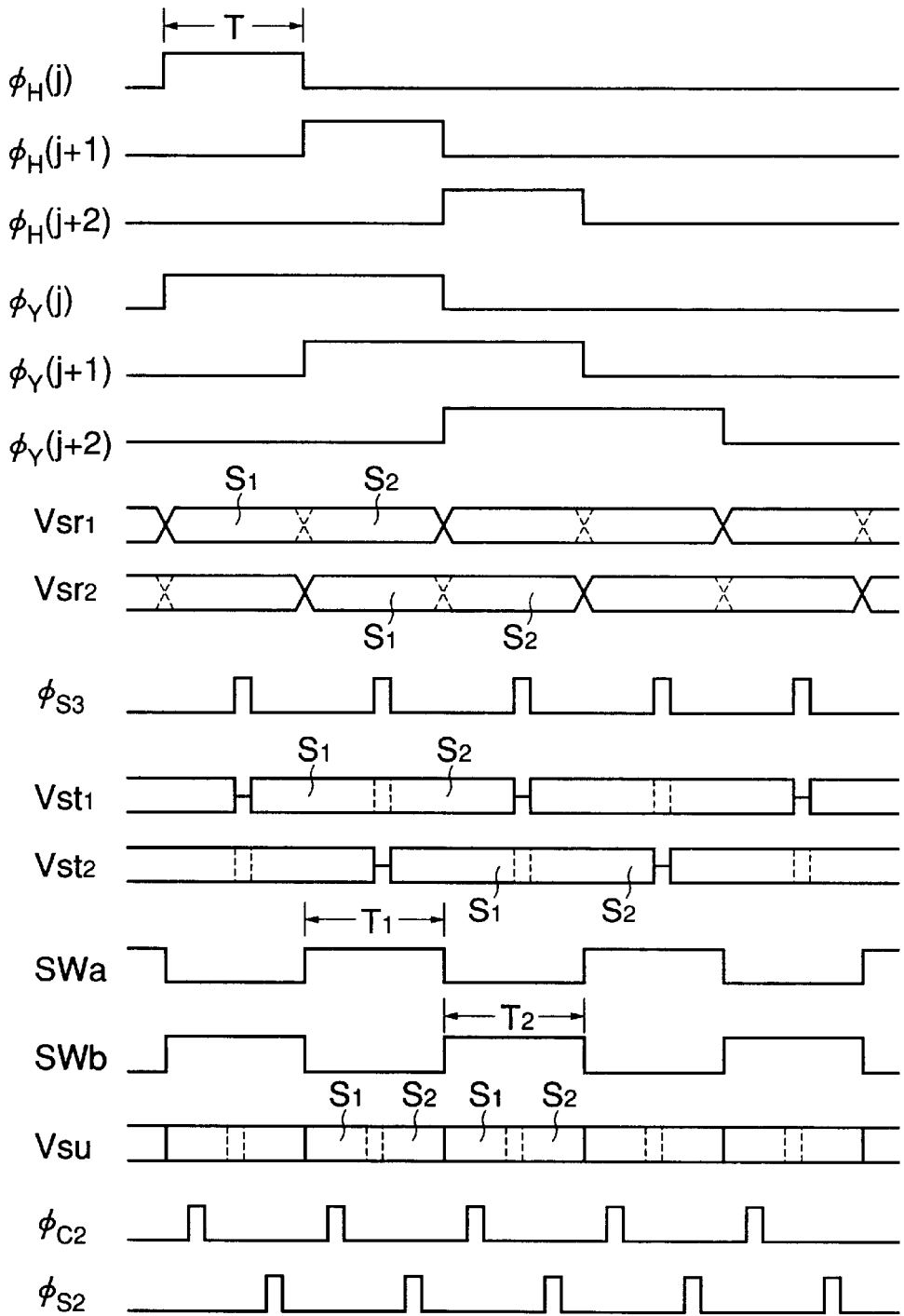
FIG. 2 is a timing chart illustrating signal application timing for the circuitry of an amplification type solid-state imaging device according to one embodiment of the present invention.

FIG. 2 is a timing chart illustrating signal application timing for the circuitry shown in FIG. 1. Reference is made to FIGS. 1 and 2 in the following explanation. As described above, the amplifiers 155 shown in FIG. 1 are provided in a one-to-one correspondence with the respective vertical signal lines. Signal pairs each including a pixel signal and a reference signal are applied to the respective amplifiers 155 via the corresponding vertical signal line continuity switches 157 which are respectively driven by pulses $\phi_H(j)$, $\phi_H(j+1)$, .... Each two consecutive vertical signal lines 145 are grouped. A signal from an amplifier 155 for a (2m−1)-th vertical signal line 145 (m: a positive integer) in each two-line group is applied to a first horizontal signal line $V_{sr1}$ via the corresponding read-out switch 156, while a signal from an amplifier 155 for a (2m)-th vertical signal line 145 is applied to a second horizontal signal line $V_{sr2}$ via the corresponding read-out switch 156.

The pixel signal and the reference signal are outputted through the amplifier 155 by the operation of the vertical signal line continuity switch 157 during the first half and the second half, respectively, of an ON period of the read-out switch 156. Although which of the pixel signal and the reference signal is outputted during the first half period is not critical, it is herein assumed that the pixel signal is outputted during the first half period.

Pulses $\phi_H(j)$, $\phi_H(j+1)$, ... in a pulse string having a pulse width of T and a shift amount of T are sequentially outputted from the horizontal scanning circuit 160 of FIG. 1. Each two consecutive pulses in the pulse string are ORed by the OR circuit 162, and the resultant pulses $\phi_Y(j)$, $\phi_Y(j+1)$, $\phi_Y(j+2)$, ... are respectively applied to the corresponding read-out switches 156 as shown in FIG. 2. Therefore, the read-out switches 156 are each kept ON during a period of 2T, and the ON periods of the read-out switches for each two consecutive signal lines 145 overlap with each other by a period of T. Thus, only the signal for the (2m−1)-th vertical signal line is applied to the horizontal signal line $V_{sr1}$ in a cycle of 2T to sequentially provide a pixel signal $S_1$ and a reference signal $S_2$ during the first half T period and during the second half T period, respectively.

Similarly, only the signal for the (2m)-th vertical signal line is applied to the horizontal signal line $V_{sr2}$ in a cycle of 2T to sequentially provide a pixel signal $S_1$ and a reference signal $S_2$ during the first half T period and during the second half T period, respectively.

Further, the reference signal $S_2$ which corresponds to the second half of the signal applied to the horizontal signal line $V_{sr1}$ from one vertical signal line overlaps with the pixel signal $S_1$ which corresponds to the first half of the signal applied to the horizontal signal line $V_{sr2}$ from another adjacent vertical signal line during a period of T.

With the aforesaid operation, the capacitance of each of the vertical signal lines to be driven by the amplifiers 155 is reduced to one half, and the read-out period is doubled as compared with the single-line read-out operation. This ensures easier high-speed driving.

As shown in FIG. 1, the signals from the horizontal signal lines $V_{sr1}$ and $V_{sr2}$ are respectively applied to the sample/hold circuits 165, and sampled and held by way of a common pulse $\phi_{S3}$ in a cycle of T.

The signals from the respective sample/hold circuits 165 are applied as horizontal signals $V_{st1}$ and $V_{st2}$ to the corresponding selection switches 167 via the corresponding buffer amplifiers 166. The selection switches 167 are each comprised of a known switching circuit. As shown in FIG. 2, the selection switches 167, i.e., switches $S_{wa}$ and $S_{wb}$ on the horizontal signal lines $V_{sr1}$ and $V_{sr2}$, are alternately operative in a cycle of T. Thus, a signal component from the horizontal signal line $V_{sr1}$ and a signal component from the horizontal signal line $V_{sr2}$ are alternately outputted from the corresponding selection switches 167 in a cycle of T to provide a common signal $V_{su}$. That is, the signal components respectively applied from the two horizontal signal lines $V_{sr1}$ and $V_{sr2}$ and each including the pixel signal $S_1$ and the reference signal $S_2$ in pair are combined into the common signal $V_{su}$, which is in turn outputted to the common signal line.

The first and second halves of each signal component of the common signal $V_{su}$ in one cycle T correspond to the pixel signal $S_1$ and the reference signal $S_2$, respectively. The common signal $V_{su}$ is applied to the CDS circuit 168, in which the common signal is subjected to a clamp operation during the first half period of the cycle for the pixel signal Si under application of a clamp pulse $\phi_{c2}$, and then subjected to a sample/hold operation during the second half period of the cycle for the reference signal $S_2$ under application of a sample/hold pulse $\phi_{s2}$. Thus, a differential signal $V_{SH}$ between the pixel signal $S_1$ and the reference signal $S_2$ is outputted from the CDS circuit 168. The differential signal $V_{SH}$ is amplified by the buffer amplifier 169, and then outputted as a sensor signal OS from the buffer amplifier 169.

Since the differential signal $V_{SH}$ is indicative of a differential between the pixel signal $S_1$ and the reference signal $S_2$, the FPN of the signal inherent to a transmission path can be reduced irrespective of which of the amplifiers 155 and which of the horizontal signal lines the signal has been transmitted through.

The aforesaid operation, though involving a two-line read-out operation, allows for the CDS operation as in the single-line read-out operation. Thus, the signal variations among the amplifiers 155 as well as the signal variations between the two horizontal signal lines can be eliminated. It is also advantageous that easier high-speed driving can be ensured. A switch/CDS circuit 180 including the selection switches 167 and the CDS circuit 168 as enclosed by a broken line in FIG. 1 will be described later in detail.

Figure 5:
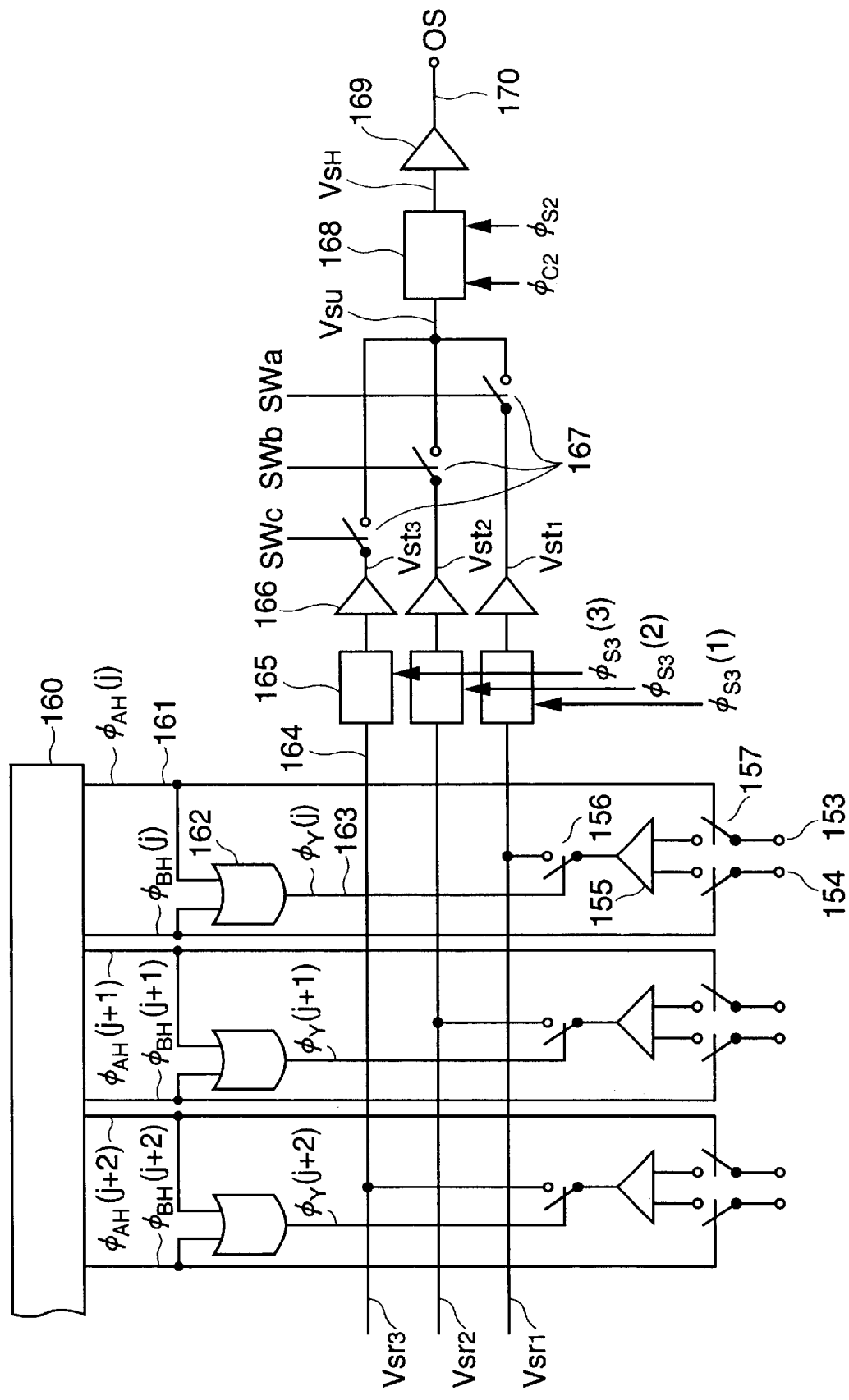
FIG. 5 is a circuit block diagram illustrating an amplification type solid-state imaging device according to another embodiment of the present invention.

FIG. 5 is a circuit block diagram illustrating an amplification type solid-state imaging device according to another embodiment of the present invention. Circuitry for the imaging device according to this embodiment is substantially the same as the circuitry shown in FIG. 1, except that each three vertical signal lines are grouped and, accordingly, three horizontal signal lines are provided.

Figure 6:
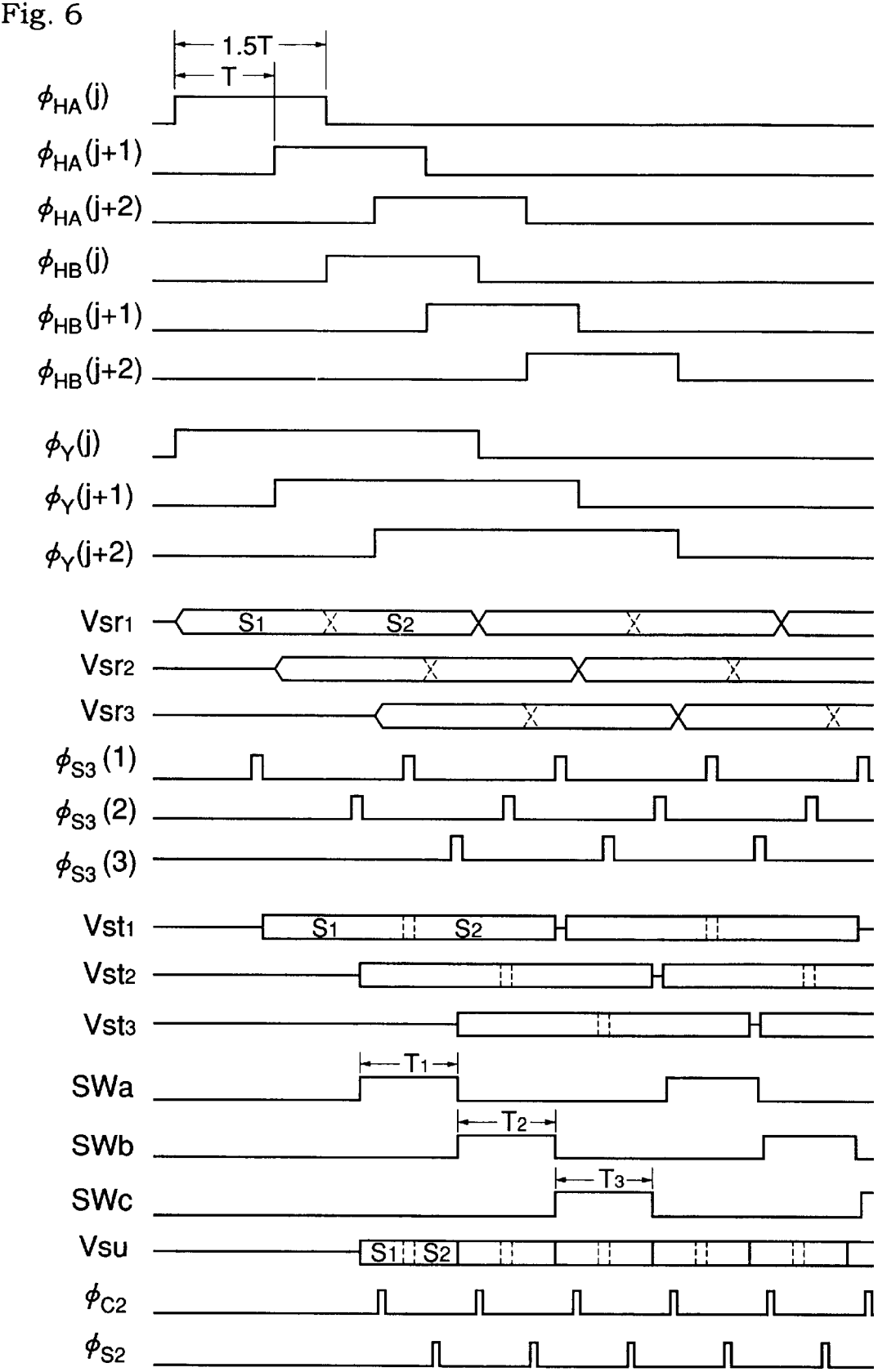
FIG. 6 is a timing chart illustrating signal application timing for the circuitry of an amplification type solid-state imaging device according to one embodiment of the present invention.

FIG. 6 is a timing chart illustrating signal application timing for the circuitry shown in FIG. 5. Reference is made to FIGS. 5 and 6 in the following explanation. As described above, the amplifiers 155 shown in FIG. 5 are provided in a one-to-one correspondence with the respective vertical signal lines. A pixel signal and a reference signal are applied to each of the amplifiers 155. Each three consecutive vertical signal lines 145 are grouped. A signal from an amplifier 155 for a first vertical signal line 145 in each three-line group is applied to a first horizontal signal line $V_{sr1}$ via the corresponding read-out switch 156, and a signal from an amplifier 155 for a second vertical signal line 145 is applied to a second horizontal signal line $V_{sr2}$ via the corresponding read-out switch 156. A signal from an amplifier 155 for a third vertical signal line 145 is applied to a third horizontal signal line $V_{sr3}$ via the corresponding read-out switch 156.

As in the circuitry of FIG. 1, the pixel signal and the reference signal are outputted through the vertical signal line continuity switch 157 and the amplifier 155 during the first half and the second half, respectively, of an ON period of the read-out switch 156. Although which of the pixel signal and the reference signal is outputted during the first half period is not critical, it is herein assumed that the pixel signal is outputted during the first half period.

Pulses $\phi_{HA}(j+1)$, . . . and pulses $\phi_{HB}(j)$, $\phi_{HB}(j+1)$, . . . in two pulse strings each having a pulse width of 1.5T and a shift amount of T are sequentially outputted from the horizontal scanning circuit 160 of FIG. 5. The $\phi_{HB}$ pulse string is delayed by a period of 1.5T after the $\phi_{HA}$ pulse string. The pulses $\phi_{HA}(j)$, $\phi_{HA}(j+1)$, . . . in the $\phi_{HA}$ pulse string are respectively ORed with the pulses $\phi_{HB}(j)$, $\phi_{HB}(j+1)$, . . . in the $\phi_{HB}$ pulse string by the OR circuit 162, and the resultant pulses $\phi_Y(j)$, $\phi_Y(j+1)$, $\phi_Y(j+2)$, . . . are respectively applied to the corresponding read-out switches 156 as shown in FIG. 6. Therefore, the read-out switches 156 are each kept ON during a period of 3T, and the ON periods of the read-out switches for each two consecutive vertical signal lines 145 overlap with each other by a period of 2T. Thus, only the signal for the first vertical signal line in the three-line group is applied to the horizontal signal line $V_{sr1}$ in a cycle of 3T to sequentially provide a pixel signal $S_1$ and a reference signal $S_2$ during the first half 1.5T period and during the second half 1.5T period, respectively.

Similarly, only the signal for the second vertical signal line in the three-line group is applied to the horizontal signal line $V_{sr2}$ in a cycle of 3T to sequentially provide a pixel signal $S_1$ and a reference signal $S_2$ during the first half 1.5T period and during the second half 1.5T period, respectively. Further, only the signal for the third vertical signal line in the three-line group is applied to the horizontal signal line $V_{sr3}$ in a cycle of 3T to sequentially provide a pixel signal $S_1$ and a reference signal $S_2$ during the first half 1.5T period and during the second half 1.5T period, respectively.

With the aforesaid operation, the capacitance of each of the vertical signal lines to be driven by the amplifiers 155 is reduced to one third, and the read-out period is tripled as compared with the single-line read-out operation. This ensures easier high-speed driving.

As shown in FIG. 5, the signals from the horizontal signal lines $V_{sr1}$, $V_{sr2}$ and $V_{sr3}$ are respectively applied to the sample/hold circuits 165, and sampled and held by way of pulses $\phi_{S3}(1)$, $\phi_{S3}(2)$ and $S_3(3)$, respectively, in a cycle of 1.5T.

The signals from the respective sample/hold circuits 165 are applied to the corresponding selection switches 167 via the corresponding buffer amplifiers 166. As shown in FIG. 6, the selection switches 167, i.e., switches $S_{wa}$, $S_{wb}$ and $S_{wc}$ on the horizontal signal lines $V_{sr1}$, $V_{sr2}$ and $V_{sr3}$, are sequentially operative in a cycle of T. Thus, signal components from the horizontal signal lines $V_{sr1}$, $V_{sr2}$ and $V_{sr3}$ are sequentially outputted from the corresponding selection switches 167 in a cycle of T to provide a common signal $V_{su}$. That is, signal components respectively applied from the three horizontal signal lines $V_{sr1}$, $V_{sr2}$ and $V_{sr3}$ and each including the pixel signal $S_1$ and the reference signal $S_2$ in pair are combined into the common signal $V_{su}$, which is in turn outputted to the common signal line.

As in FIG. 2, the first and second halves of each signal component of the common signal $V_{su}$ in one cycle T correspond to the pixel signal $S_1$ and the reference signal $S_2$, respectively. The common signal $V_{su}$ is applied to the CDS circuit 168, in which the common signal is subjected to a clamp operation during the first half period of the cycle for the pixel signal $S_1$ under application of a clamp pulse $\phi_{c2}$, and then subjected to a sample/hold operation during the second half period of the cycle for the reference signal $S_2$ under application of a sample/hold pulse $\phi_{S2}$.

Thus, a differential signal $V_{SH}$ between the pixel signal $S_1$ and the reference signal $S_2$ is outputted from the CDS circuit 168. The differential signal $V_{SH}$ is amplified by the buffer amplifier 169, and then outputted as a sensor signal OS from the buffer amplifier 169.

The aforesaid operation, though involving a three-line read-out operation, allows for the CDS operation as in the single-line read-out operation. Thus, the signal variations among the amplifiers 155 as well as the signal variations among the three horizontal signal lines can be eliminated. It is also advantageous that easier high-speed driving is ensured, as described above.

Although the switch/CDS circuit 180 including the selection switches 167 and the CDS circuit 168 is schematically illustrated in FIGS. 1 and 5, a more specific circuit configuration of the switch/CDS circuit 180 will next be described. An explanation will herein be given only to a circuit configuration for the circuitry of FIG. 1. However, the circuit configuration for the circuitry of FIG. 5 is substantially the same as for the circuitry of FIG. 1, except that the three horizontal signal lines are provided instead of the two horizontal signal lines.

Figure 7A:
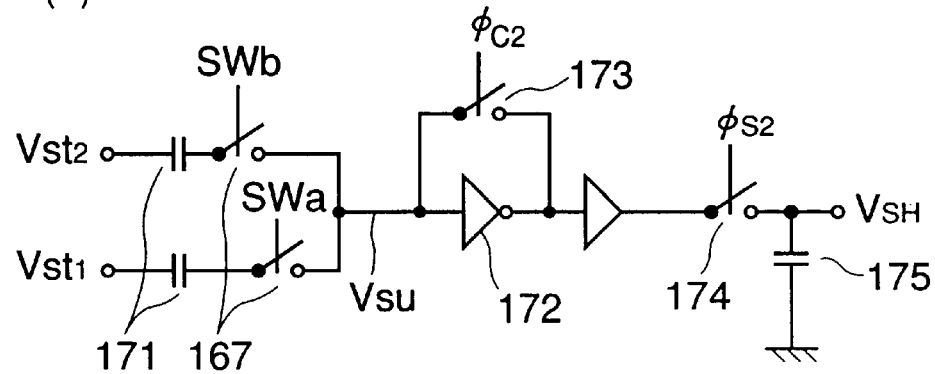
FIG. 7(*a*) is a circuit diagram illustrating a specific example of a switch/CDS circuit of an amplification type solid-state imaging device according to one embodiment of the present invention.
Figure 7B:
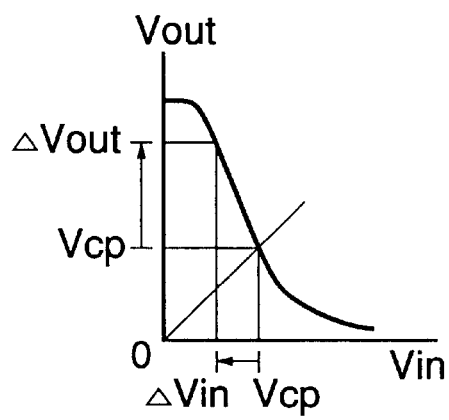
Figure 8:
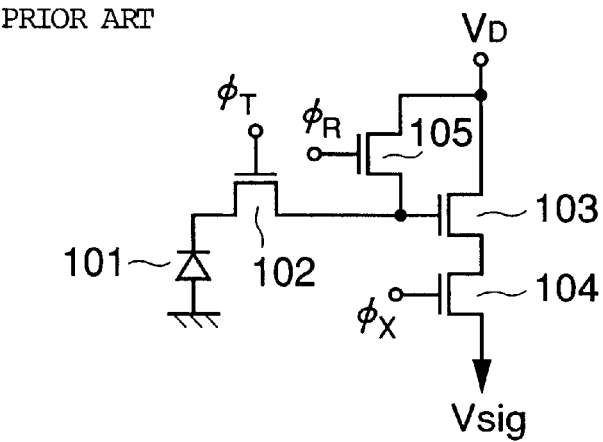
FIG. 8 is a circuit diagram illustrating an example of a horizontal pixel arrangement according to a conventional amplification type solid-state imaging device.
Figure 9:
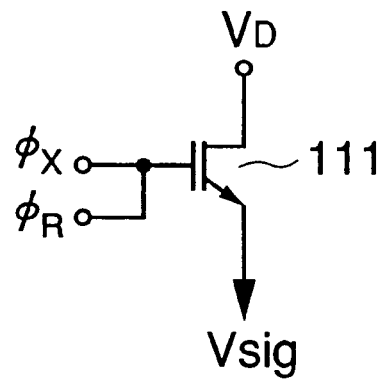
FIG. 9 is a circuit diagram illustrating an example of a vertical pixel arrangement according to a conventional amplification type solid-state imaging device.
Figure 10:
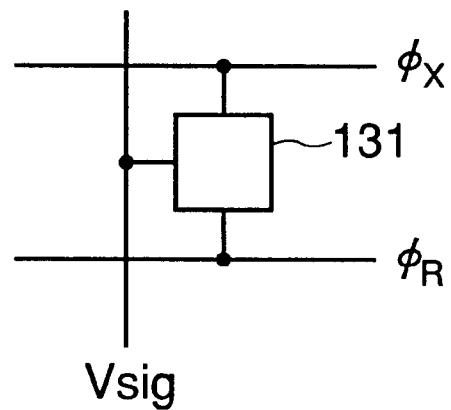
FIG. 10 is a schematic diagram illustrating a pixel according to a conventional amplification type solid-state imaging device.

FIGS. 7(*a*) and 7(*b*) illustrate one example of the switch/CDS circuit 180 to be applied to the circuitry of FIG. 1. Particularly, FIG. 7(*a*) is a circuit diagram, and FIG. 7(*b*) is a graph showing a relationship between an input and an output. As described above, the switch/CDS circuit 180 includes the selection switches 167 and the CDS circuit 168. Since the operation of the selection switches 167 has already been described, an explanation will be given mainly to the CDS circuit 168. The CDS circuit 168 is adapted to provide a differential between the pixel signal and the reference signal, and functions as a differential signal detection circuit.

In FIG. 7(*a*), the first horizontal signal $V_{sr1}$ and the second horizontal signal $V_{sr2}$ from the buffer amplifiers 166 respectively provided on the two horizontal signal lines are applied to the corresponding clamp capacitors 171 and selection switches 167 thereby to be combined into the common a signal $V_{su}$ on the common signal line. Then, the common signal is inputted into an inverting amplifier 172. Input and output terminals of the inverting amplifier 172 are connected to a short switch 173, which is opened and closed under the control of the clamp pulse $\phi_{c2}$.

When the input and output terminals of the inverting amplifier 172 are shorted in response to the ON of the clamp pulse $\phi_{c2}$, the potential of the inverting amplifier 172 is fixed at a specific potential $V_{cp}$, which depends on amplification characteristics thereof as shown in FIG. 7(*b*). This provides a clamp potential.

As shown in the timing chart of FIG. 2, when the clamp pulse $\phi_{c2}$ is turned ON with the selection switch $SW_a$ being ON and with the pixel signal $S_1$ of the first horizontal signal $V_{sr1}$ being applied, the pixel signal $S_1$ level is clamped.

When the clamp pulse $\phi_{C2}$ is turned OFF, the inverting amplifier 172 is held in an amplification enabled state. In this state, an output signal change $\Delta V_{out}$ for a change $\Delta V_{in}$ between the pixel signal $S_1$ and the reference signal $S_2$ is provided by the inverting amplifier 172 with the selection switch $SW_a$ being ON and with the reference signal $S_2$ of the first horizontal signal $V_{sr1}$ being applied.

An output signal $\Delta V_{out}$, which is obtained through amplification of the differential between the pixel signal $S_1$ and the reference signal $S_2$ of the first horizontal signal $V_{st1}$ by sampling and holding the output signal change by the sample/hold switch 174, is held by the hold capacitor 175.

Similarly, when the clamp pulse $\phi_{c2}$ is turned ON with the selection switch $SW_b$ being ON and with the pixel signal $S_1$ of the second horizontal signal $V_{st2}$ being applied, the pixel signal $S_1$ level is clamped.

When the clamp pulse $\phi_{c2}$ is turned OFF, the inverting amplifier 172 is held in an amplification enabled state. In this state, an output signal change $\Delta V_{out}$ for a change $\Delta V_{in}$ between the pixel signal $S_1$ and the reference signal $S_2$ is provided by the inverting amplifier 172 with the selection switch $SW_b$ being ON and with the reference signal $S_2$ of the second horizontal signal $V_{st2}$ being applied.

An output signal $\Delta V_{out}$, which is obtained through amplification of the differential between the pixel signal $S_1$ and the reference signal $S_2$ of the second horizontal signal $V_{st2}$ by sampling and holding the output signal change by the sample/hold switch 174, is held by the hold capacitor 175.

The output signals $\Delta V_{out}$ respectively obtained through the amplification of the differential between the pixel signal $S_1$ and the reference signal $S_2$ of the first horizontal signal $V_{st1}$ and through the amplification of the differential between the pixel signal $S_1$ and the reference signal $S_2$ of the second horizontal signal $V_{st2}$ and held by the hold capacitor 175 are each outputted as the differential signal $V_{SH}$ between the pixel signal $S_1$ and the reference signal In the amplification type solid-state imaging devices according to the aforesaid embodiments, n horizontal signal lines are provided. Two signals, i.e., a pixel signal and a reference signal, for each pixel are transmitted through each of the n horizontal signal lines during a period in which n pixels are horizontally scanned. Then, signals on the n horizontal signal lines are sequentially extracted into a single line by switching, and a differential signal between the pixel signal and the reference signal in each of the extracted signals is outputted. This arrangement provides the following advantages.

Since the n horizontal signal lines are read in parallel, the horizontal read-out speed can be reduced to 1/n, and the load capacitance of each of the horizontal signal lines is reduced to 1/n. Therefore, proper driving of the imaging device can be ensured even if the overall read-out speed is increased. Further, the n horizontal signal lines driven in parallel are finally combined into a single common signal line, on which the differential between the pixel signal and the reference signal for each horizontal signal line component is obtained. Therefore, signal variations among then horizontal signal lines can be eliminated. That is, the finally outputted signal is equivalent to that outputted through the single-line read-out operation.

By providing the CDS circuit including the clamp circuit and the sample/hold circuit on the single common signal line, the signal on the common signal line can be subjected to the CDS operation at a high speed, so that the signal variations due to differences in intrinsic characteristics of the horizontal signal lines as well as the signal variations due to differences in intrinsic characteristics of the amplifiers provided on the respective vertical signal lines can be eliminated even at high speed read-out. Therefore, the present invention is highly effective in practical applications.

In accordance with the present invention, signal pairs each including a pixel signal and a reference signal are transmitted through a plurality of horizontal signal lines, and selectively extracted from the horizontal signal lines into a single common signal line to provide a differential signal between the pixel signal and the reference signal in each of the signal pairs. Thus, easier high-speed driving is ensured, and the output signal is less liable to suffer from the fixed pattern noise inherent to each transmission path.

What is claimed is:

1. An amplification type solid-state imaging device comprising:
    a pixel region including a plurality of amplification type photo-electric conversion elements arranged in a matrix array and each defining a pixel;
    vertical signal lines provided in a one-to-one correspondence with columns of the array in the pixel region for transmitting a pixel signal and a reference signal for each pixel;
    a plurality of horizontal signal lines;
    a horizontal scanning circuit for sequentially transmitting signal pairs each including the pixel signal and the reference signal from the respective vertical signal lines to the plurality of horizontal signal lines;
    a selection switch for sequentially switching the plurality of horizontal signal lines to selectively apply the signal pairs each including the pixel signal and the reference signal from the plurality of horizontal signal lines into a single common signal line; and
    a differential signal detection circuit for providing a differential signal between the pixel signal and the reference signal in each of the signal pairs transmitted through the common signal line
    wherein the pixel signal is a differential signal between the bright signal and the reset signal from each of the amplification type photo-electric conversion elements, and the reference signal is a constant potential signal.

2. The amplification type solid-state imaging device according to claim 1, wherein the plurality of horizontal signal lines comprises n horizontal signal lines (n: an intefer not smaller than 2) and
    each n consecutive vertical signal lines are grouped and respectively connected to the n horizontal signal lines in a one-to-one correspondence.

3. The amplification type solid-state imaging device according to claim 2, wherein n is 2.

4. The amplification type solid-state imaging device according to claim 2, wherein n is 3.

5. The amplification type solid-state imaging device according to claim 1, wherein read-out switches are provided between the vertical signal lines and the horizontal signal lines, and
    the read-out switches are sequentially opened and closed by the horizontal scanning circuit to read out the pixel signal and the reference signal in pair from each of the vertical signal lines and transit them to the plurality horizontal signal lines.

6. The amplification type solid-state imaging device according to claim 1, wherein an amplifier is provided on each of the vertical signal lines.

7. The amplification type solid-sate imaging device according to claim 1, wherein a sample/hold circuit and a buffer amplifier are provided between the selection switch and each of the horizontal signal lines.

8. The amplification type solid-state imaging device according to claim 1, wherein the pixel signal is a bright signal from each of the amplification type photo-electric conversion elements when light is applied, and the reference signal is a reset signal from each of the amplification type photo-electric conversion elements when reset is applied.

9. The amplification type solid-state imaging device according to claim 1, wherein a clamp circuit and a sample/hold circuit are provided on the common signal line, so that the differential signal between the pixel signal and the reference signal is provided by clamping one of the pixel signal and the reference signal transmitted in pair through the common signal line by the clamp circuit and sampling and holding the other signal by the sample/hold circuit.

10. The amplification type solid-state imaging device according to claim 9, wherein the clamp circuit comprises capacitors respectively connected to the horizontal signal lines in series, an inverting amplifier provided on the common signal line, and a short switch provided between an input and an output of the inverting amplifier.

11. An image reader in which the amplification type solid-state imaging device according to any one of claims 1 to 10 is incorporated as a two-dimensional CMOS image sensor.

12. An amplification type solid-state imaging device comprising:
- a pixel region including a plurality of amplification type photo-electric conversion elements arranged in a matrix array and each defining a pixel;
- vertical signal lines provided in a one-to-one correspondence with columns of the array in the pixel region for transmitting a pixel signal and a reference signal for each pixel;
- a plurality of horizontal signal lines;
- a horizontal scanning circuit for sequentially transmitting signal pairs each including the pixel signal and the reference signal from the respective vertical signal lines to the plurality of horizontal signal lines;
- a selection switch for sequentially switching the plurality of horizontal signal lines to selectively apply the signal pairs each including the pixel signal and the reference signal from the plurality of horizontal signal lines into a single common signal line;
- a differential signal detection circuit for providing a differential signal between the pixel signal and the reference signal in each of the signal pairs transmitted through the common signal line;
- a sample/hold circuit between the selection switch and each of the horizontal signal lines; and
- a buffer amplifier between the selection switch and each horizontal signal line.

13. An amplification type solid-state imaging device comprising:
- a pixel region including a plurality of amplification type photo-electric conversion elements arranged in a matrix array and each defining a pixel;
- vertical signal lines provided in a one-to-one correspondence with columns of the array in the pixel region for transmitting a pixel signal and a reference signal for each pixel;
- a plurality of horizontal signal lines;
- a horizontal scanning circuit for sequentially transmitting signal pairs each including the pixel signal and the reference signal from the respective vertical signal lines to the plurality of horizontal signal lines;
- a selection switch for sequentially switching the plurality of horizontal signal lines to selectively apply the signal pairs each including the pixel signal and the reference signal from the plurality of horizontal signal lines into a single common signal line; and
- a differential signal detection circuit for providing a differential signal between the pixel signal and the reference signal in each of the signal pairs transmitted through the common signal line;
- a clamp circuit on the common signal line; and
- a sample/hold circuit on the common signal line, so that the differential signal between the pixel signal and the reference signal is provided by clamping one of the pixel signal and the reference signal transmitted in pair through the common signal line by the clamp circuit and sampling and holding the other signal by the sample/hold circuit.

14. The amplification type solid-state imaging device according to claim 13, wherein the clamp circuit includes capacitors respectively connected to the horizontal signal lines in series, an inverting amplifier provided on the common signal line, and a short switch provided between an input and an output of the inverting amplifier.

* * * * *